United States Patent [19]
Robey

[11] Patent Number: 5,836,662
[45] Date of Patent: Nov. 17, 1998

[54] VERTICAL STACKING SYSTEM USING CONTROLLED ACCESS METHOD

[75] Inventor: Timothy J. Robey, Portland, Me.

[73] Assignee: Bellheimer Metallwerk GmbH, Germany

[21] Appl. No.: 931,510

[22] Filed: Sep. 16, 1997

Related U.S. Application Data

[62] Division of Ser. No. 549,167, Oct. 27, 1995, abandoned.

[51] Int. Cl.⁶ .................................................. A47B 49/00
[52] U.S. Cl. .............................. 312/268; 312/97; 312/327
[58] Field of Search .................................. 312/268, 267, 312/139.2, 91, 97, 266, 139, 312, 319.5, 223.1, 42, 327; 221/76, 77, 78, 119, 120, 151, 241, 13

[56] References Cited

U.S. PATENT DOCUMENTS

| | | | |
|---|---|---|---|
| 3,190,706 | 6/1965 | Hatcher et al. | 312/97 |
| 3,199,658 | 8/1965 | Graber et al. | 312/97 X |
| 3,235,319 | 2/1966 | Anders et al. | 312/268 |
| 3,236,577 | 2/1966 | Anders et al. | 312/268 |
| 3,243,034 | 3/1966 | Mueller et al. | 312/97 |
| 3,428,384 | 2/1969 | Goldammer | 312/267 X |
| 3,531,171 | 9/1970 | Raabe et al. | 312/268 |
| 3,861,519 | 1/1975 | Ware | 312/266 X |
| 4,650,264 | 3/1987 | Dahnert | 312/268 |
| 5,249,855 | 10/1993 | Franklin et al. | 312/139.2 X |
| 5,269,597 | 12/1993 | Yenglin et al. | 312/42 |

FOREIGN PATENT DOCUMENTS

| | | | |
|---|---|---|---|
| 499276 | 8/1992 | European Pat. Off. | 312/35 |
| 3610347 | 10/1987 | Germany | 312/268 |
| 5116711 | 5/1993 | Japan | 312/42 |
| 2172881 | 10/1986 | United Kingdom | 312/268 |

OTHER PUBLICATIONS

Remstar catalog, 2 pages.
Hanel carousel, 1 page (publication date unknown).
Powermation, Inc., Product Retrieval System; 1 page (publication date unknown) and four photographs (description of each photograph is given in the Information Disclosure Statement) 1996.

*Primary Examiner*—Jose V. Chen
*Assistant Examiner*—James O. Hansen
*Attorney, Agent, or Firm*—Evenson, McKeown, Edwards & Lenahan, P.L.L.C.

[57] ABSTRACT

A storage and retrieval system, such as a vertical carousel or vertical lift module, and access method provides substantially improved control over access to the contents stored in the system. A desired number of small doors are provided at an access area to limit an operator to obtaining a product from only that compartment on a carrier adjacent the access area. The doors are slidable or pivotable and can be locked and unlocked by a mechanism. The carousel is provided with carriers having compartments which can be divided into desired arrays depending upon product size and mix. The carriers are selectively movable to one of several positions adjacent the access area. Access to the carriers can be obtained through placement of an access area on one side or both sides of the machine. Electronic controls can be provided for each storage system or external computer controls can be used for a group of storage systems to permit more efficient use of the controls as well as remote placement of the storage systems.

8 Claims, 18 Drawing Sheets

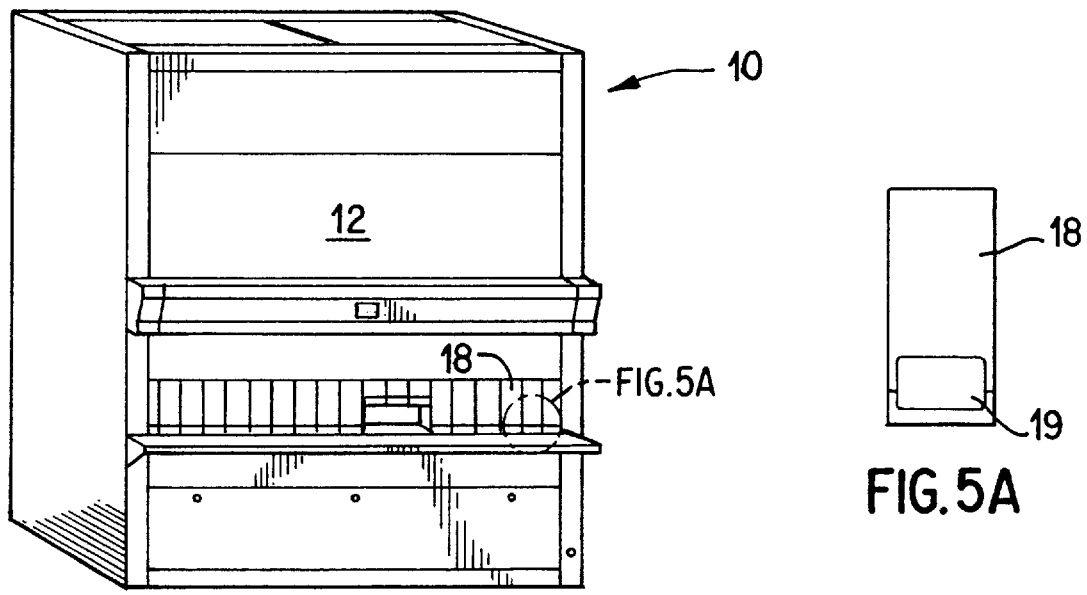
FIG.5
FIG.5A
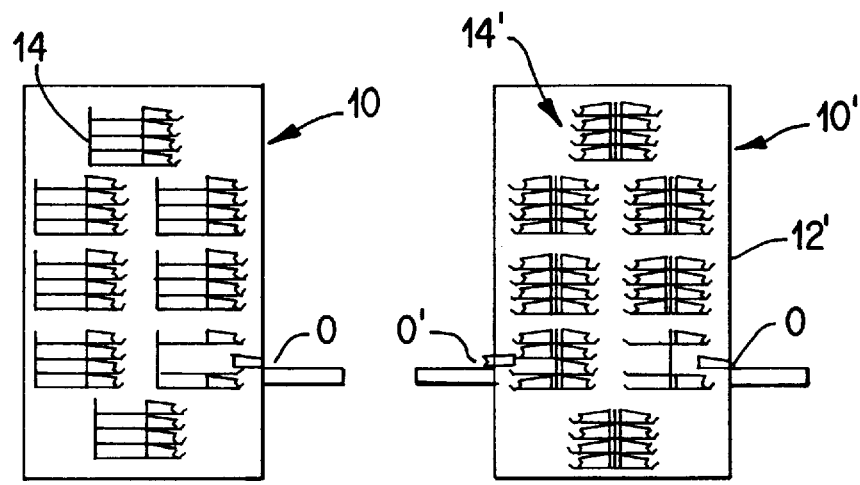
FIG.6A
FIG.6B

FULL HEIGHT

1/4 HEIGHT  1/2 HEIGHT  3/4 HEIGHT

VERTICAL STACKING SYSTEM USING CONTROLLED ACCESS METHOD

This is a divisional of application Ser. No. 08/549,167, filed Oct. 27, 1995, now abandoned.

BACKGROUND AND SUMMARY OF THE INVENTION

The present invention relates to an improvement in vertical carousels, vertical lift modules and other types of storage and retrieval equipment. More particularly, the present invention relates to a vertical carousel and method which use an array of electronically controlled doors, such as sliding doors, pivoting doors and the like.

Storage and retrieval equipment technology, for example, vertical carousel technology, and products embodying that technology are both well known and well accepted for commercial and industrial applications. For instance, vertical carousels are used extensively in manufacturing operations to store tools and small parts. Vertical carousels have numerous advantages among which are economy of real estate, product accessibility, amenability to computerization and reduced access times. Real estate economy as used above means that valuable floor space is recovered by the ability to store products overhead in otherwise unused air space. Product accessibility means both faster and ergonomically correct access to the stored products. A typical conventional vertical carousel having the aforementioned advantages is shown in FIG. 1.

However, such commercially available carousels lack sufficient control over the products, e.g. parts, tools, etc., stored on the carriers. That is, it is easy to obtain access to products on the carrier other than those which have been specifically requested by the operator. The large access opening in the carousel of FIG. 1 permits even operators having authorized access to a particular product to have unauthorized access to other products on the same carrier or exposed carriers which pass by the access opening while en route to a selected carrier. Consequently, current-day carousels do not take full advantage of computer technology in limiting access to authorized users to specific products and thereby maintaining an accurate inventory of the carousel contents as well as accountability of operators who may have erroneously returned products to the wrong compartment or who may not have returned them at all.

An object of the present invention is, therefore, to provide a vertical carousel with greatly improved accessibility while, at the same time, restricting and monitoring access for greater control.

Another object of the present invention is, therefore, to provide both greater flexibility in storable product size and greater flexibility in product mix.

Still another object of the present invention is to allow improved returnability of a product and also to provide ready ascertainability of product availability.

Yet a further object of the present invention is to provide unobstructed access to products of various widths when multiple doors are used by eliminating partitions and slide-tracks of conventional carousel sliding doors.

The foregoing and other objects have been achieved with a vertical carousel in which an array of doors in the form of sliding doors, flap doors and the like are installed at the conventional access opening in front of the rotating carriers in such a way that only the necessary number of compartments are exposed within the storage area.

Access to the products stored in the compartments is allowed via electronically controlled locking and unlocking to provide both access restriction and access monitoring. In particular, access is allowed and the doors are opened only after entry of acceptable identification data.

Flexibility is achieved in accordance with the present invention by allowing, where appropriate, more than one door to be opened simultaneously. As a result, the vertical carousel using this feature has greater flexibility in product size variation, e.g. wider products, as well as a mix of different product configurations.

Furthermore, additional flexibility is provided by controlling the height or amount of door opening. Consequently, products of different height, as well as a mix of product sizes, can be stored in the carousel.

Because of the ability to configure carriers in a variety of setups, the carriers of the vertical carousel of the present invention can be programmed to stop at one of several positions, thereby exposing supplemental shelves and various height compartments accommodating the different product mix stored therein. When a product is to be returned to the carousel for storage, a vacant compartment is returned to the operator in the same manner as when the product was first retrieved.

To improve accountability for missing or misplaced products, a see-thru window is provided in each of the doors. These windows give the operator an opportunity to observe product availability before accepting responsibility for the transaction. By way of example, an operator who wants a set of drill bits causes the carousel to spin to the presumably proper location. However, before the door associated with the drill bits is unlocked, the carousel electronics request operator confirmation. When the requested confirmation has been given, the system opens the appropriate door(s) to the appropriate height and logs that particular operator as having accessed the drill bits. If, on the other hand, no confirmation is given, the door remains locked, the location is flagged (error condition) and the previous operator who confirmed a transaction at that location is subject to scrutiny.

BRIEF DESCRIPTION OF THE DRAWINGS

These and other objects, features and advantages of the present invention will become more readily apparent from the following detailed description thereof when taken in conjunction with the accompanying drawings wherein:

FIG. 5 is a schematic perspective front view similar to FIG. 2D but showing isolated in the circled area and on an enlarged scale a door with a see-thru window representative of all the doors;

FIG. 6A is a schematic side view of the carousel shown in FIGS. 2A through 2D with standard single (or one-sided) access;

FIG. 6B is a schematic side view similar to FIG. 6A but showing a dual (or two-sided) access;

DETAILED DESCRIPTION OF THE DRAWINGS

Figure 1:
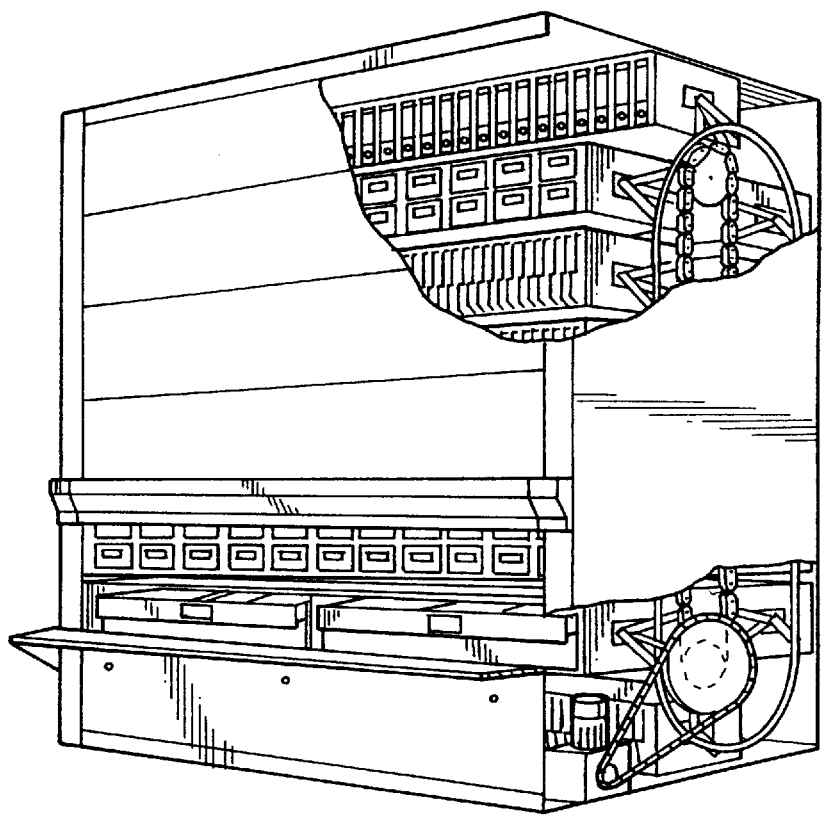
FIG. 1 Is a perspective view of the front and side of a standard vertical storage carousel with a portion of the housing removed to show the various types of storage compartments and drives.

For ease of understanding of the present invention and to dispense with description of conventional features, the system described herein is intended to operate, generally speaking, in accordance with standard operation features of a vertical carousel such as shown in FIG. 1. That is, storage compartments on rotating carriers are moved in the vertical direction in a carousel-like manner so as to move along the front side and the rear side of a housing interior via a chain drive. Vertical carousels are products offered, for example, by Remstar International, Inc. of Westbrook, Me.

Figure 2A:
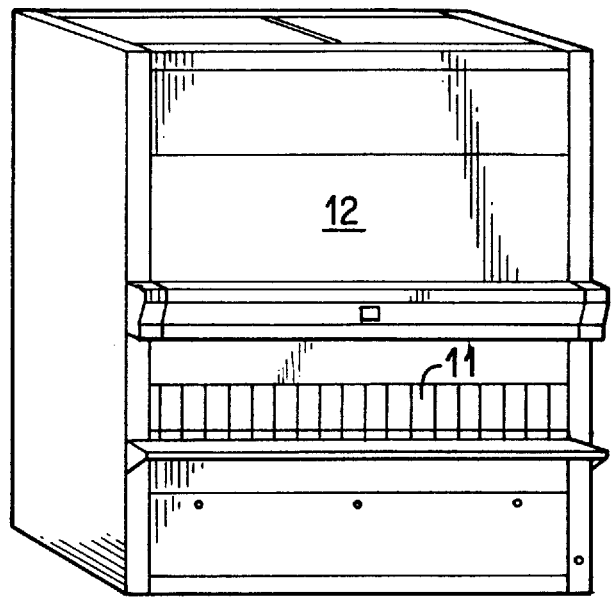
FIG. 2A is a schematic perspective front and side view of a vertical storage carousel in accordance with one embodiment of the present invention in which sliding doors are used and the doors are in a closed position.
Figure 2B:
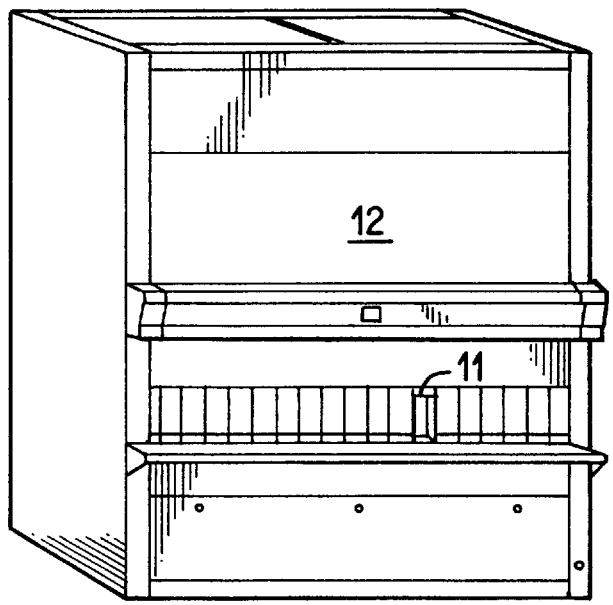
FIG. 2B is a view similar to FIG. 2A but with one door in a fully open position for withdrawal or return of a tall, narrow product.
Figure 2C:
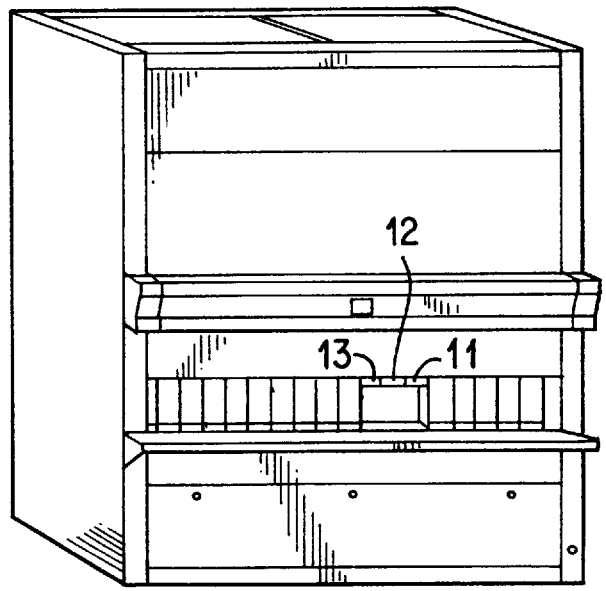
FIG. 2C is a view similar to FIG. 2A but with three adjacent doors in the fully open position for withdrawal or return of a tall, wide product.
Figure 2D:
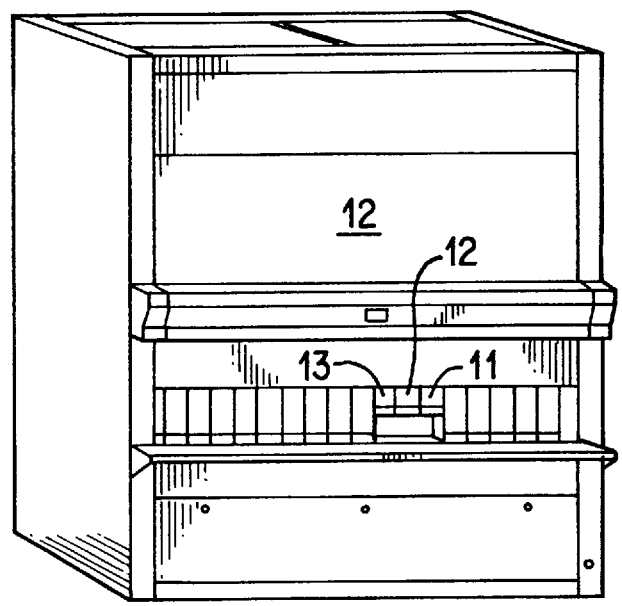
FIG. 2D is a view similar to FIG. 2C but with the three adjacent doors in a partially open position for the withdrawal or return of a short, wide product.

Referring now to FIGS. 2A and 2D, such a standard-type vertical carousel is schematically shown and designated generally by the numeral 10. However, this carousel 10 incorporates within a housing 12 the present invention which includes a unique door system installed at the standard access opening in front of the rotating carriers as hereinafter fully described. FIG. 2A shows a condition of the carousel 10 in which all seventeen drawers by numeral 11, on the front of the carousel housing 12 are closed and secured. It will be readily understood, of course, that the number, size and shape of the drawers is arbitrary and will depend on the user's requirements.

Now with reference to FIG. 2B, the specific single drawer 11 has been slid upwardly into the housing 12 to provide access to the contents of the compartment which has been moved to the position by an operator's selection and which, because of product size, requires full-height sliding of the door 12. For a wider product of the same height, or for access to more than one compartment on a shelf, two or more of the doors can be slid upwardly through a full height as seen in FIG. 2C where three doors are fully raised. Alternatively, for shorter products, the door can be moved up partially. Likewise, for wider products which are also shorter, two or more doors can be moved up partially, as seen in FIG. 2D where three of the doors 11, 12, 13 have been partially raised into the housing 12. Unlike the conventional large access opening shown in FIG. 1, however, the door system of the present invention exposes only a smaller area for better control of access to specific compartments containing the contents on the rotating carriers.

The doors can be electronically controlled with standard programmable microprocessor controls so as to lock and unlock the doors selectively. That is, each operator will have his or her own identification information for obtaining access to the contents of the carousel 10. Both for security and inventory purposes, one or more of the doors will open only after inputting acceptable operator identification as well as product coding.

The ability to open more than one door such as doors 11, 12 and/or 13, and to slide the door(s) to less than full height opening provides greater flexibility in product size and mix variation within the carousel 10 without compromising security particularly in light of other measures such as mounting of the doors to provide access to the carriers laterally of and below the selected compartment. Consequently, any combination of short, tall, narrow and wide products can be provided in various compartments on a rotating carrier (not shown) while maintaining limited access. The electronics and programming techniques for sliding the one or more doors open to different size openings are well known to persons skilled in this art to implement the teachings of the present application.

The rotating carriers in the carousel 1 of FIGS. 2A through 2D can be stopped in any one of several positions adjacent to the doors 11, 12, 13 . . . to expose shelves and compartments of various heights. FIG. 1 shows that it is generally known that the rotating carriers can have a wide variety of configuration for handling different product sizes. As seen schematically in FIG. 3, for example, a carrier 14 having two additional shelf levels 15 and 16 at different spacings can be, via the computer control, stopped on the second shelf 16 adjacent the sliding door (not shown) to expose only that area for permitting access to or return of a product P from that specific shelf 16 to that area adjacent a workstation 17.

Figure 3:
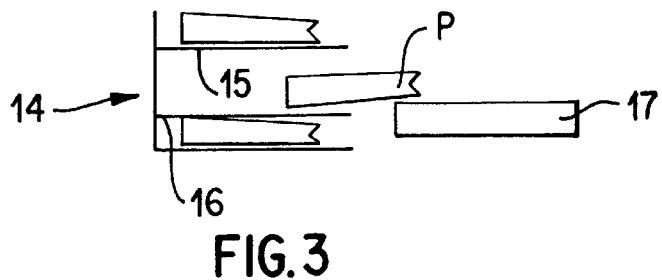
FIG. 3 is a schematic side view showing compartments or shelves arranged at different heights on the same carrier to accommodate different product sizes with the ability to locate the shelves at the access opening adjacent a workstation.
Figure 4A:
FIGS. 4A through 4D are schematic front views showing various configurations of carrier compartments.
Figure 4C:
Figure 4B:
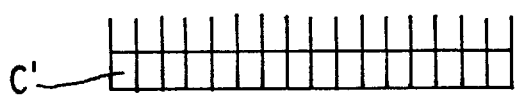
Figure 4D:
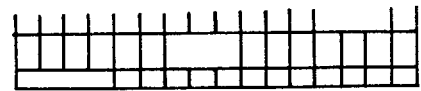

Also, FIGS. 4A through 4D show how compartments can be divided on a rotating carrier 14 of the type illustrated in FIG. 3. In particular, FIG. 4A shows sixteen elongated compartments C for relatively long, narrow items; FIG. 4B shows a regular array of thirty-two compartments C'; FIG. 4C shows a regular array of sixty-four small compartments C"; and FIG. 4D shows an irregular array of miscellaneous compartments for wide and narrow products. It will be understood, of course, that the procedure for an operator to return product to a vacant, appropriately sized compartment on a carrier shelf is essentially the reverse of the procedure for obtaining access to the product except, where appropriate, for inputting different coding data to the system electronics for inventory control and subsequent error condition purposes.

One of the doors 18 shown in the carousel 10 of FIGS. 2A through 2D is seen on an enlarged scale in the isolated view of FIG. 5. A see-thru window 19 is provided at the lower end of each door, not just door 18, to give the operator visual verification that the requested product is, in fact, available before accepting responsibility for the transaction. For example, if the operator requires a set of drill bits, he or she rotates the carousel to the appropriate location. However, before electronically unlocking the specific door or doors, the system requests operator confirmation. If confirmation is provided within the appropriate timeframe, that operator is logged as having accessed the part and unlocking of the door or doors occurs. If no confirmation occurs, however, the door(s) remains locked and the location is flagged, i.e. an error condition. Moreover, the previous operator who confirmed a return transaction to that location is now identified by his or her electronic identification data. In this connection, the carousel 10 can utilize standard electronic identification devices such as barcode readers, card readers and the like to readily identify individual operators. Likewise, conventional external or internal computer controls, using standard programming techniques, are utilized in the present invention to provide the necessary restriction on access, door control, carrier rotation and inventory control.

Figure 6C:
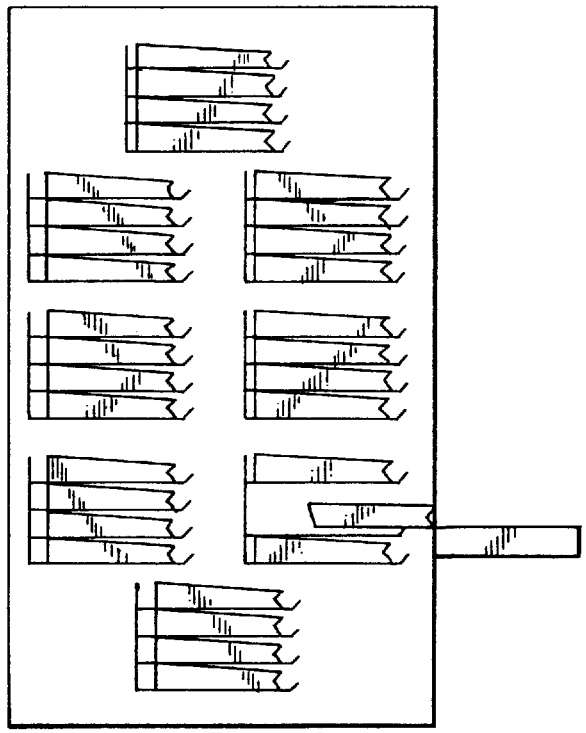
FIG. 6C is a view similar to FIG. 6A but showing how deep products can be carried.
Figure 6D:
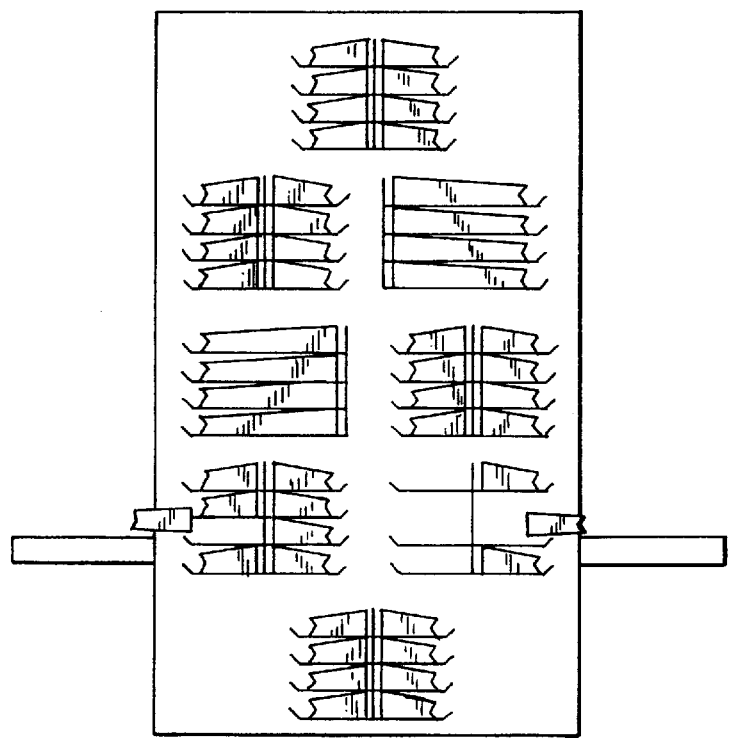
FIG. 6D is a view similar to FIG. 6B but showing how deep, as well as tall and wide, can be supported in a dual access.

In addition to the standard single or one-sided access shown in FIG. 6A for the carousel 10 of FIGS. 2A through 2D, similar in that limited sense to that of FIG. 1 as well, the present invention also provides dual or two-sided access in a modified carousel 10' as seen in FIG. 6B. The latter requires the shelves 14' to be configured so that tall and wide products are accessible from both sides of the housing 12' through the front side access area 0 and the back side access area 0'. Such an approach effectively doubles the compartment "count". FIGS. 6C and 6D show compartment layout configurations which make it possible to support deep products in addition to tall and wide products in single- and dual-access storage and retrieval equipment.

Figure 7A:
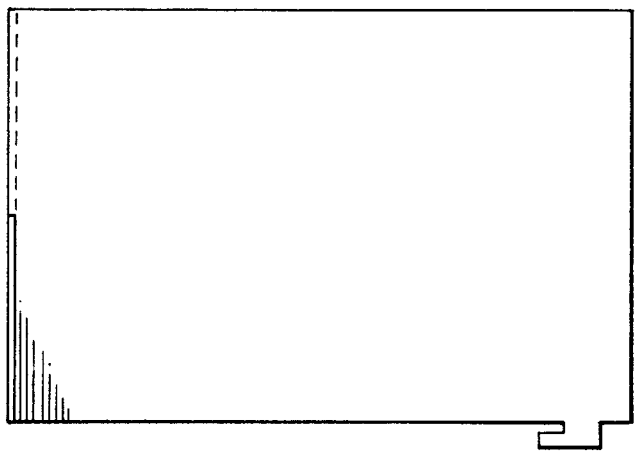
FIGS. 7A and 7B are side and end elevational views, respectively of a full height divider system for compartments on the carriers of the carousel.
Figure 7B:
Figure 8:
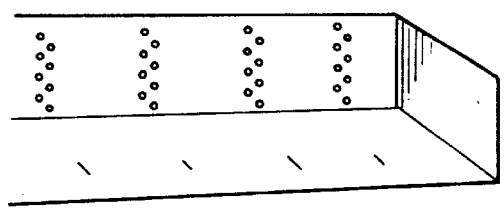
FIG. 8 is a compartment of the type intended to be utilized with the divider system of FIGS. 7A and 7B.

The compartments shown schematically in FIGS. 4A through 4D can be implemented, for example, by the shelf and full height divider system shown in FIGS. 7A, 7B and 8. Compartments on the carrier 14 can be made larger or smaller with the removable thin divider 20 shown in FIG. 7A and made of thin sheet metal, plastic or the like. One end of the divider 20 is provided with two oppositely extending narrow flanges 21, 22 which have a length about one-half of the height of the divider 20 and which reinforce the thin divider. The flanges 21, 22 also permit attachment to a rear wall 23 of the carrier 14 shown in FIG. 8. Both the flanges 21, 22 and the rear wall 23 are provided with appropriately sized and spaced holes to permit secure attachment of the divider 20 to the carrier 14 with bolts, screws, easily removable plastic push rivets of a conventional type and the like. In addition, the lower edge divider 20 is provided toward one side with a depending L-shaped or bayonet tab 24 to cooperate with a mating slot 25 in the carrier 14 for aligning the divider 20 and securing it in place on the carrier 14. Of course, other known ways of securing the dividers 20 at different location on carriers 14 can be employed without departing from the scope of the present invention.

Figure 7C:
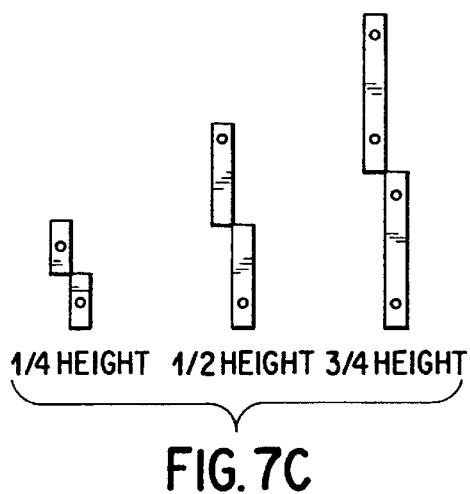
FIG. 7C is an end elevational view of three different height divider systems similar to FIGS. 7A and 7B but being, from left to right, one-quarter height, one-half height and three-quarter height.

FIG. 7C shows that other divider systems 20', 20", 20''' of different height can be used in lieu of the full height divider systems of FIGS. 7A and 7B. An important consideration in the configuration and installation of shelving and dividers is that the securing technique used readily permits the size of the compartment to be changed for different products or product mixes while, at the same time, preventing removal of the dividers to obtain unauthorized access to adjacent compartments unless the doors to those compartments as well have been legitimately unlocked. Again, standard computer control techniques can be utilized to manage each compartment with inputting of its size characteristics. As a result, the system will then know how many doors must be opened, to what height the doors must travel and where the shelves of the carriers should stop.

The present invention also allows the use of "random storage" for product storage locations. That is, locations are freed after a product has been removed, thereby creating great flexibility in terms of available storage space within the carousel. In addition, the present invention contemplates use of a single external computer to manage several such carousels via an interface with "on-board" microprocessor controllers. This then permits carousels selectively to be grouped together or placed at various locations within a facility for optimal access and minimizing labor costs.

The constructional details of the individual sliding doors and methods for actuating them individually or in groups and to different heights can vary considerably without departing from the scope of the present invention. For example, the sliding door can be configured to be lifted manually by the operator after electronic unlocking which permits authorized access and a spring or gravity return can be utilized to bring the door back to its closed position after the operator has removed or replaced the product.

Figure 9:
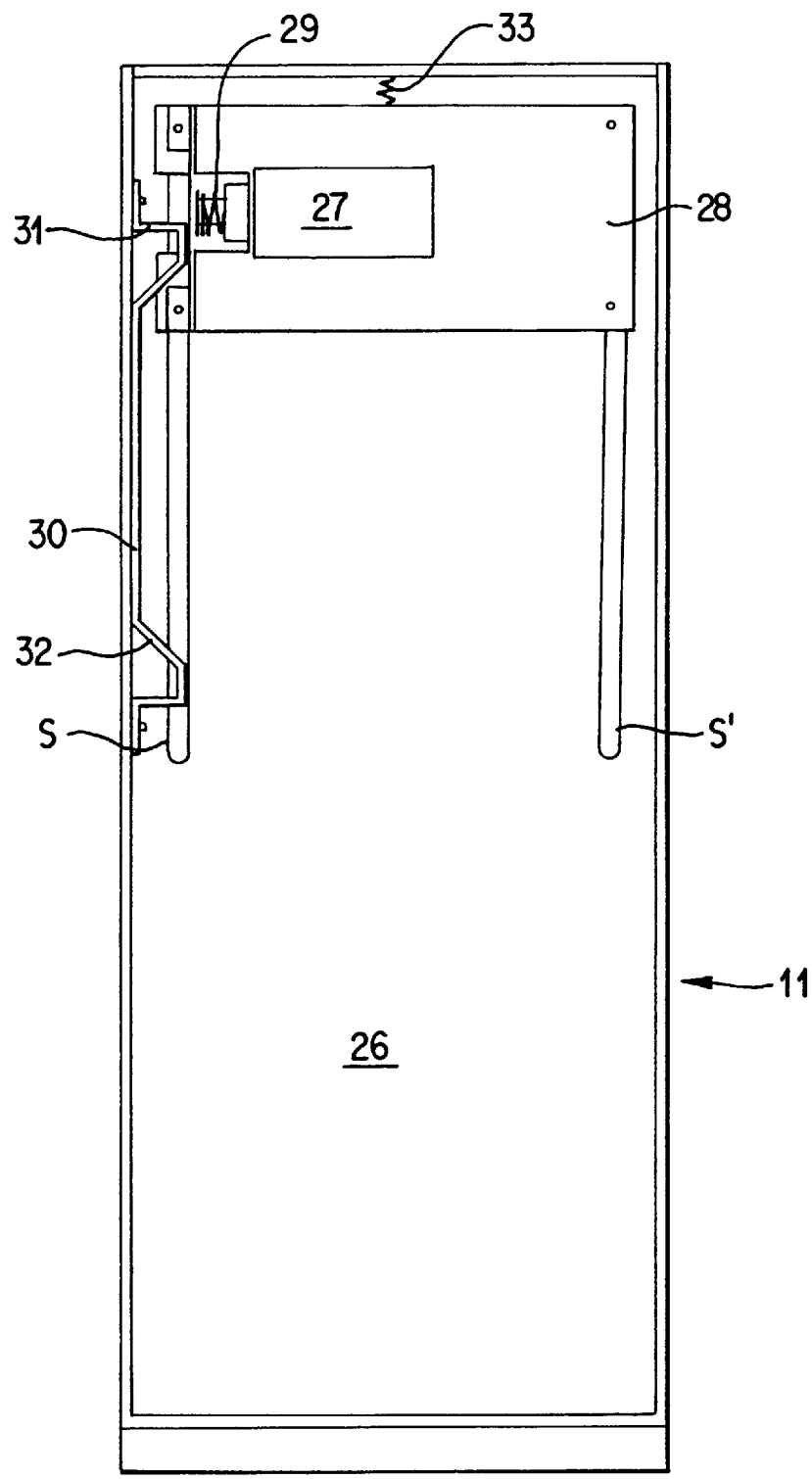
FIG. 9 is a rear view of the sliding door used in the carousel of FIG. 2A showing the basic solenoid and locking rail structure.
Figure 10C:
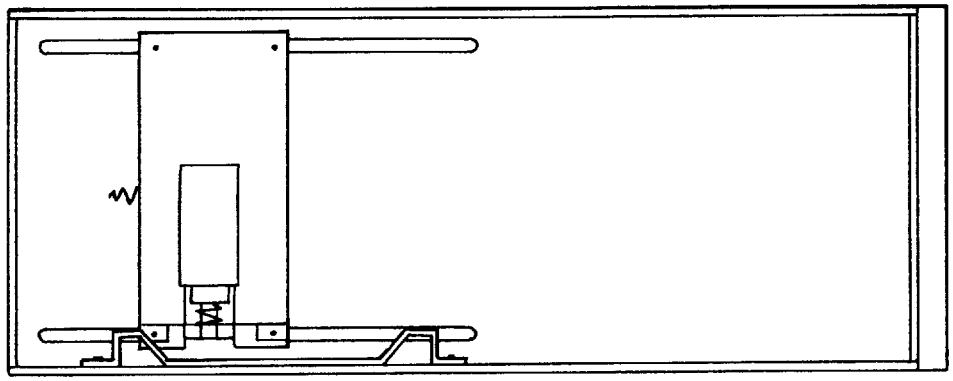
FIGS. 10A through 10E are views similar to FIG. 9 and illustrate operation of the solenoid and locking rail arrangement to permit movement of the sliding door between a fully closed position to a fully open position.
Figure 10B:
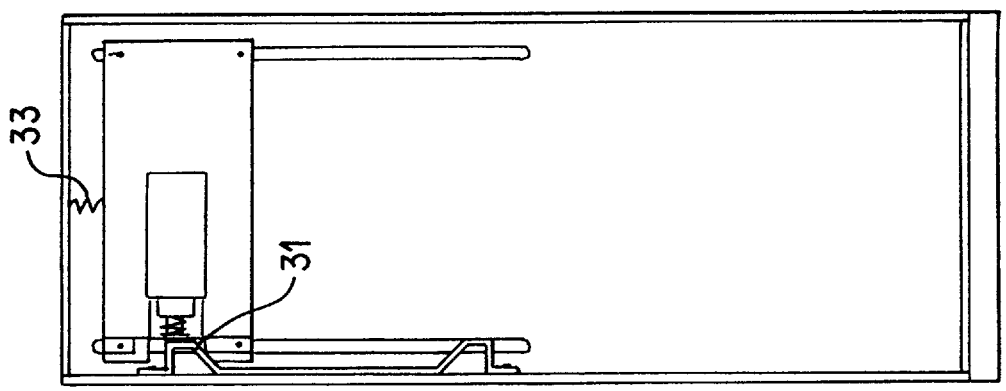
Figure 10A:
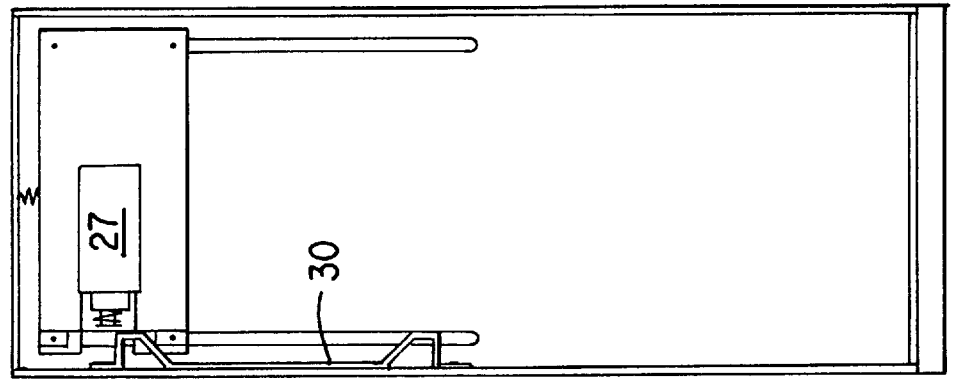
Figure 10E:
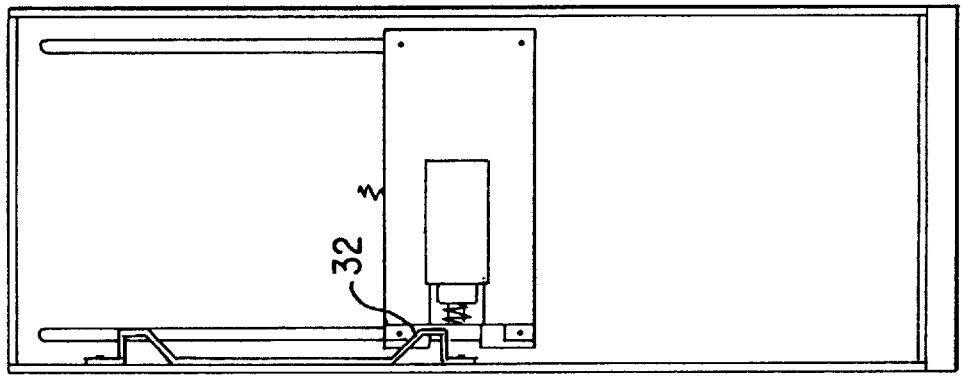
Figure 10D:
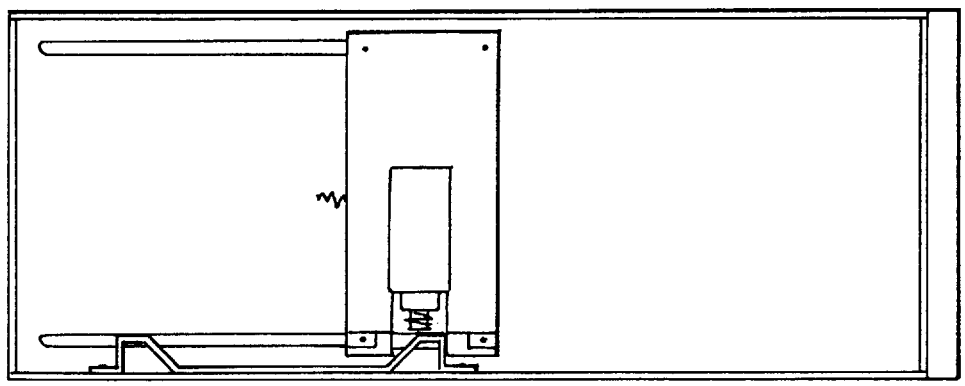

FIG. 9 illustrates constructional details at the rear side of the door 11, i.e. as viewed from the inside of the carousel housing 12. the door 11 has a back panel 26 with two vertical slots S, S' whose length determines the amount of travel that the door can make between the illustrated fully closed position and the fully open position (FIG. 10E). A solenoid 27 is mounted on a solenoid bracket 28 secured to the interior frame of the housing 12. The solenoid 27 has a spring-biased pin 29 which cooperates with a locking rail 30 also mounted on the door frame in a manner which is not accessible from the front of the carousel. The locking rail 30 has a length sized in relation to the slots S, S' and two raised portions 31, 32 near each end so as to form a horizontal abutment surface for the solenoid pin 29. As seen in FIG. 9, the fully closed door 11 is locked in place by the spring urged solenoid pin 29 engages with the horizontal surface of raised surface 31. In the fully open position illustrated in FIG. 10E, the door is held in place by the horizontal abutment surface of the raised portion 32 resting on the pin 29.

The sequential opening operation of the door shown in FIGS. 10A through 10E is applicable to each of the drawers illustrated in FIG. 2A. FIG. 10A is identical to FIG. 9 but on a reduced scale. After the operator has confirmed the presence of the desired product by looking through the see-thru window on the door(s), the computer control issues a signal which actuates the armature of the solenoid 27 to move the pin 29 against the spring bias. As the pin 29 clears the horizontal abutment surface of raised portion 31 on the locking rail 30, a spring 33 "pops" the door 11 open slightly. Depending upon how the door 11 is configured to be opened, e.g. linear actuator, the door will continue to travel upwardly through the positions illustrated in FIGS. 10C and 10D until the pin 29 of the solenoid 27 is below the horizontal surface of the raised portion 32. At that point, a signal is issued to the solenoid to deactivate the armature so that the pin 29 can be spring urged to a position underneath the horizontal abutment surface. At that time, the door 11 is locked in the fully open position.

The solenoid can, of course, also be actuated to allow sliding movement of the door 11 to a position between fully opened and fully closed. The pin 29 will then be located somewhere between the two raised portions 31, 32 of the locking rail as seen in FIG. 10C. In systems where sliding of the door is effected mechanically, e.g. by linear actuators, photocells can be employed to determine if the doors are open and/or the height of the door, and also to cut off actuation of the motive device in a generally well known manner.

In lieu of a sliding door of the type shown in FIGS. 2A through 2D, the doors can be "flap" doors of the type shown in FIG. 1 in the carousel designated generally by numeral 40 in which each door pivots open singly as with illustrated door 41 or in groups (not illustrated) by swinging downwardly against a rubber bumper rail and thereby providing access to the shelf and compartment which has been moved to that access opening.

Figure 11:
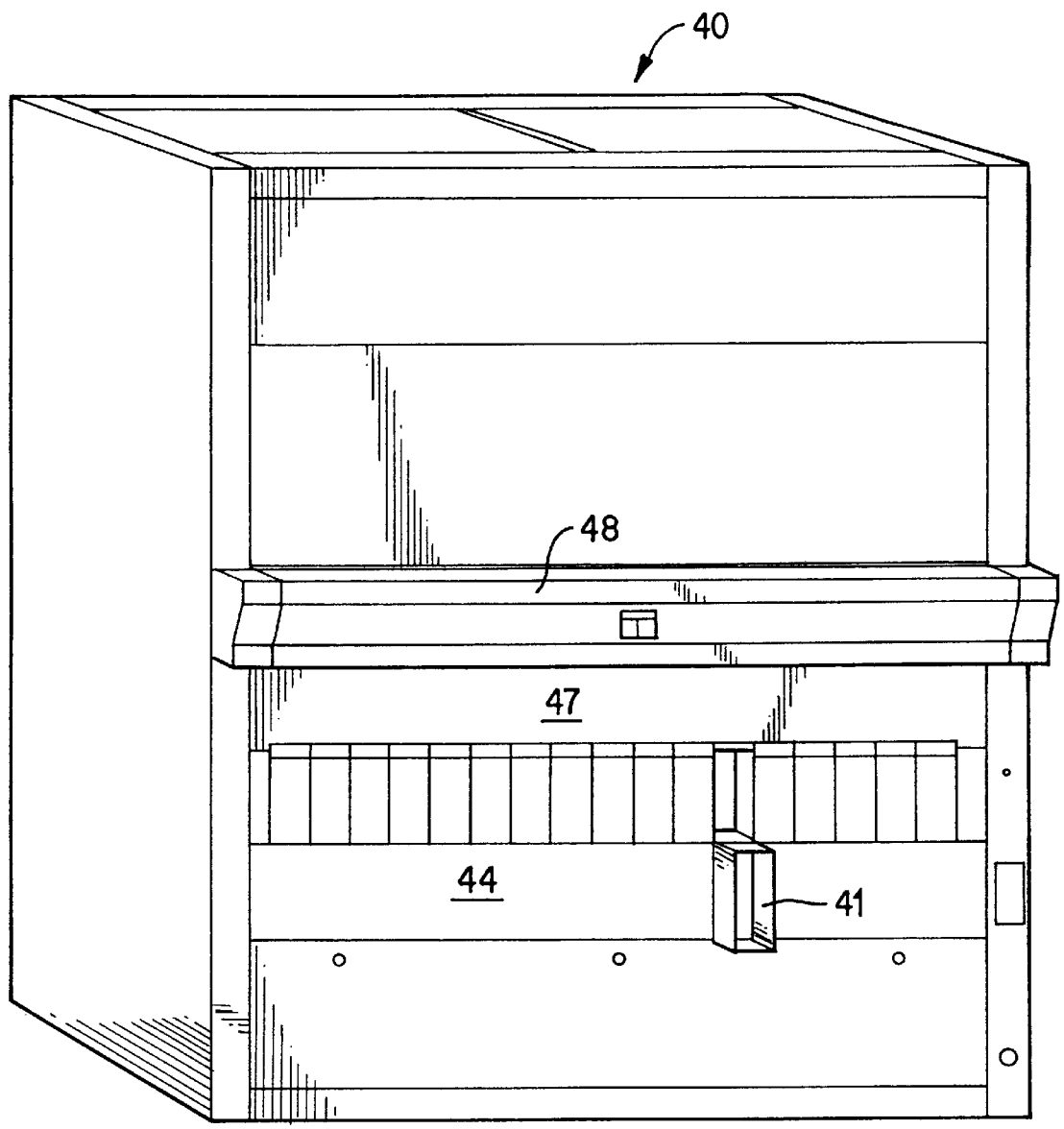
FIG. 11 is a perspective front and side view of a carousel incorporating a second embodiment of the present invention in which the doors pivot open like flaps rather than slide up and down.
Figure 12:
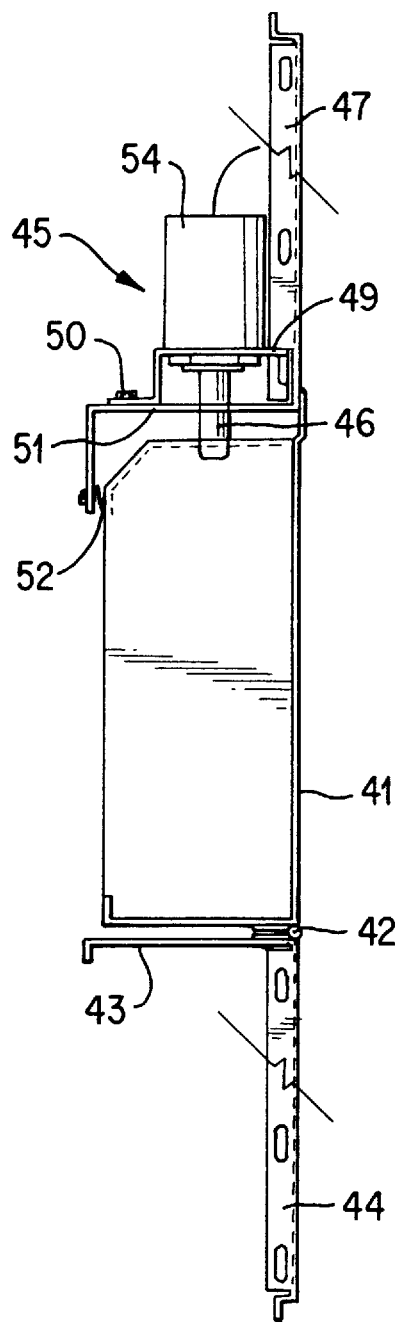
FIG. 12 is an isolated side view of the flap door, solenoid and associated housing used in the flap door carousel of FIG. 11.

In the "flap door" carousel of FIG. 11, each door can be made from aluminum or other material which is not too heavy so as to avoid slamming against the carousel housing. The door, e.g. door 41, pops open, via a solenoid control illustrated in FIG. 12, when the machine controller issues the appropriate opening signal. The door 41 is hinged at its front bottom edge to drop down about 180° onto a rubber bumper rail 44 on the housing of the carousel 40 as illustrated in FIG. 11. A slot is provided in a top panel (not shown) of the door 41 to receive a plunger pin 46 of a solenoid 45 (FIG. 12) and thereby to hold the door closed in a secured manner.

Figure 13A:
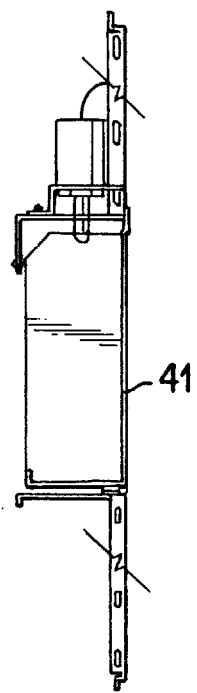
FIGS. 13A through 13C are views similar to FIG. 12 illustrating how one of the door pivots from its fully closed position toward an open position.
Figure 13B:
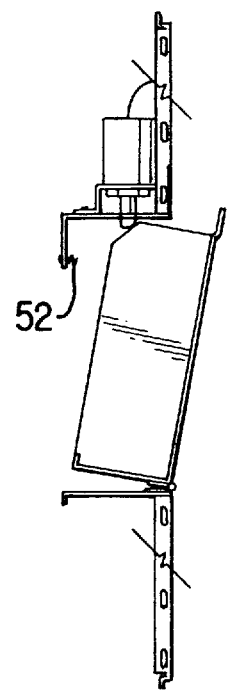
Figure 13C:
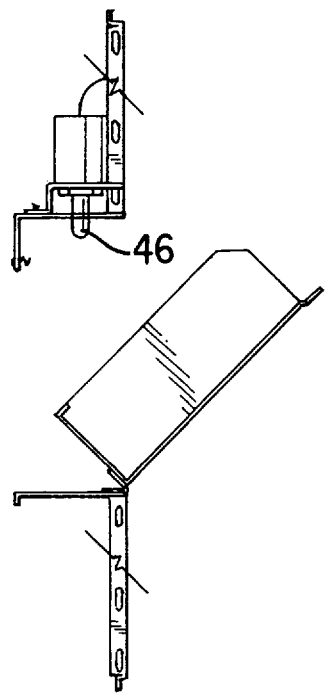

In operation, the door 41 illustrated in the position shown in FIG. 13A receives a signal from the controller causing the plunger 46 to move out of the slot in the door 41. The door 41 being then under its own weight progressively to swing radially outwardly about the hinge 42 as shown in FIGS. 13A and 13B as a result of the initial bias of the spring 52 interposed between the vertical leg of the L-shaped extension 51 and the back panel of the door 41. The weight of the door itself is sufficient to cause the door to move, after being popped out of closed position to the position shown in FIG. 11 without undue crashing against the rubber rail 44 because of the door material selected.

Fail-safe switches (not shown) can also be series-connected in the several sliding door embodiments disclosed herein into the standard system safety loop so that the carousel cannot be activated or the carriage turned until all the doors have been closed and the respective solenoid pins engaged in the slots in the top of the doors.

Figure 14:
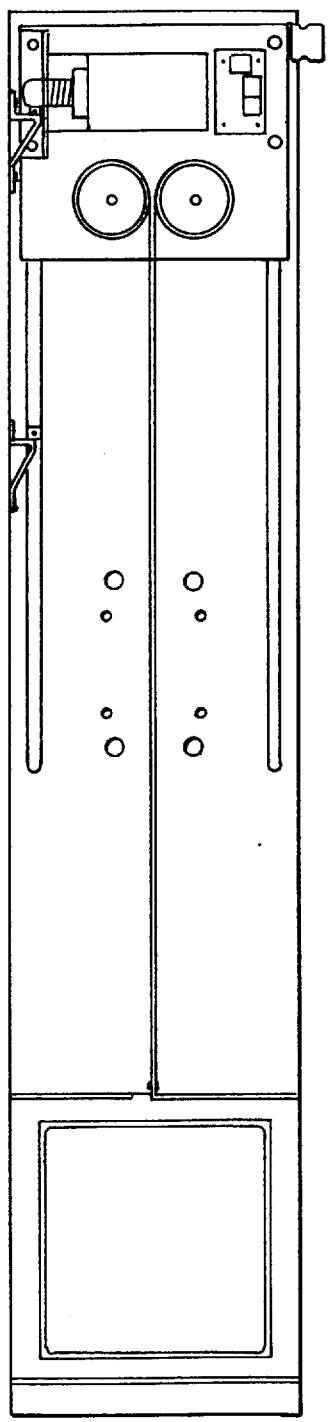
FIG. 14 is a rear view of another embodiment of the sliding door used in the carousel or the like of FIG. 2A in which constant force springs automatically slide the door open to one, two or possibly additional positions.
Figure 15A:
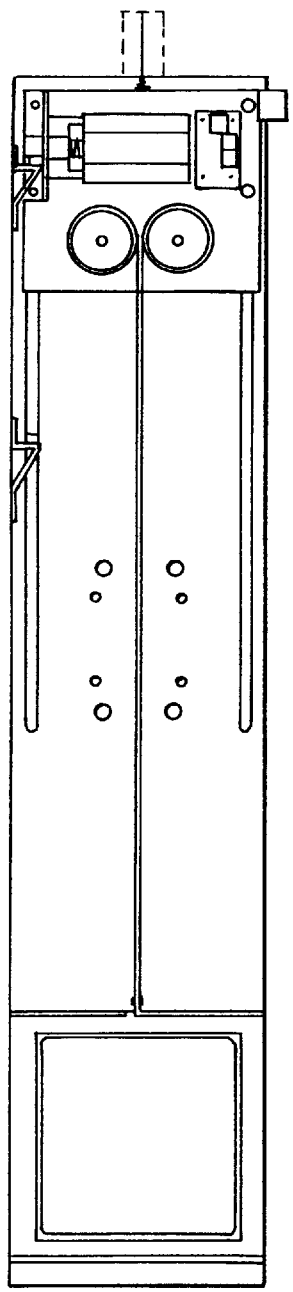
FIGS. 15A through 15D are views similar to FIG. 14 but showing how the constant-spring-force door automatically slides open to two different positions.
Figure 15B:
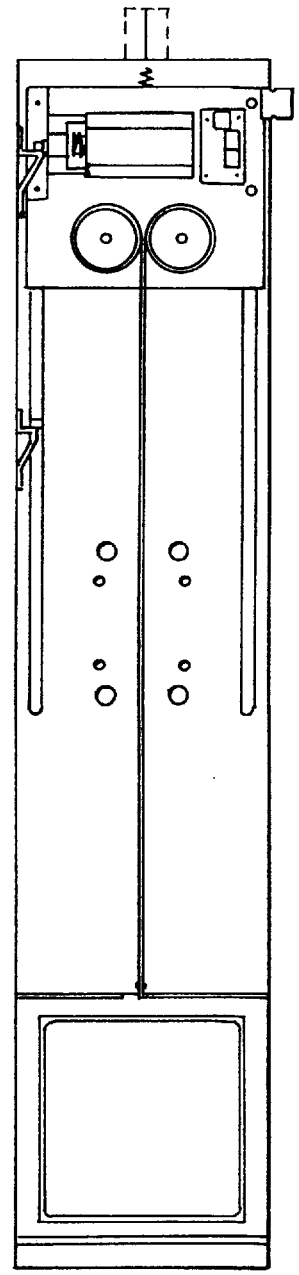
Figure 15C:
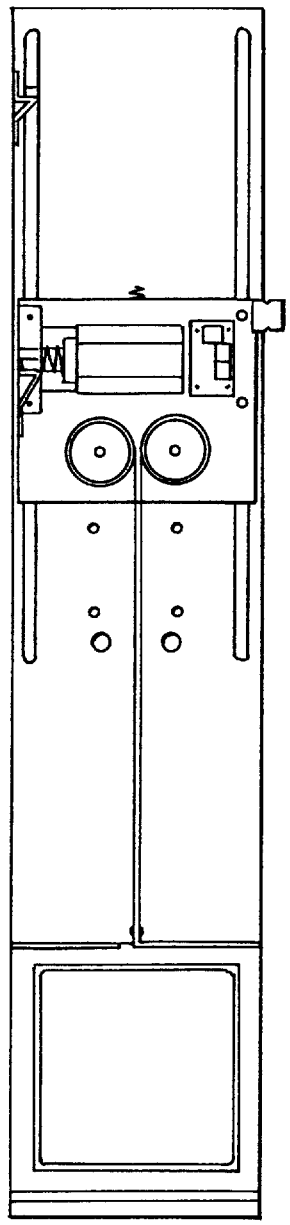
Figure 15D:
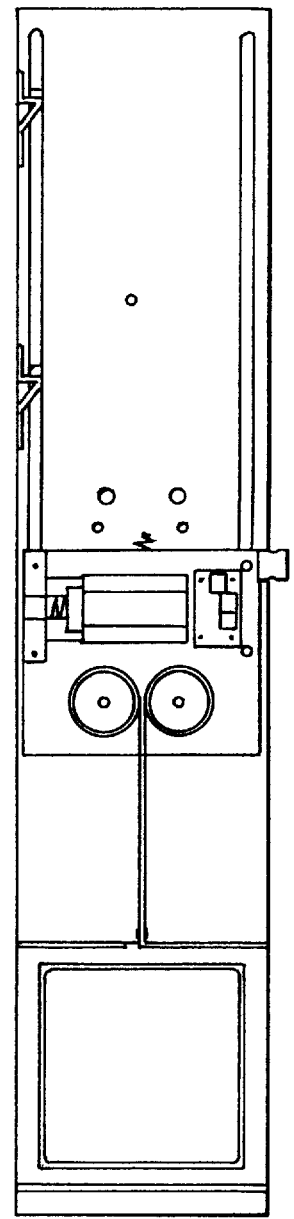

In a further embodiment of a door opening mechanism shown in FIG. 14, constant force springs designated generally by numeral 60 are used. These springs are of the type widely used in the past to counterbalance doors. The advantage of such a mechanism is that the door, after initially popping open to the position shown in FIG. 15B upon withdrawal of the solenoid plunger or pin in a manner similar to pin 29 in FIG. 9, is moved under the constant force spring bias to the first open access position in FIG. 15C where the solenoid pin engages a horizontal abutment or upon actuation of the solenoid pin to the second, higher position in FIG. 15D where, for example, a tall product is being stored or retrieved.

Figure 16:
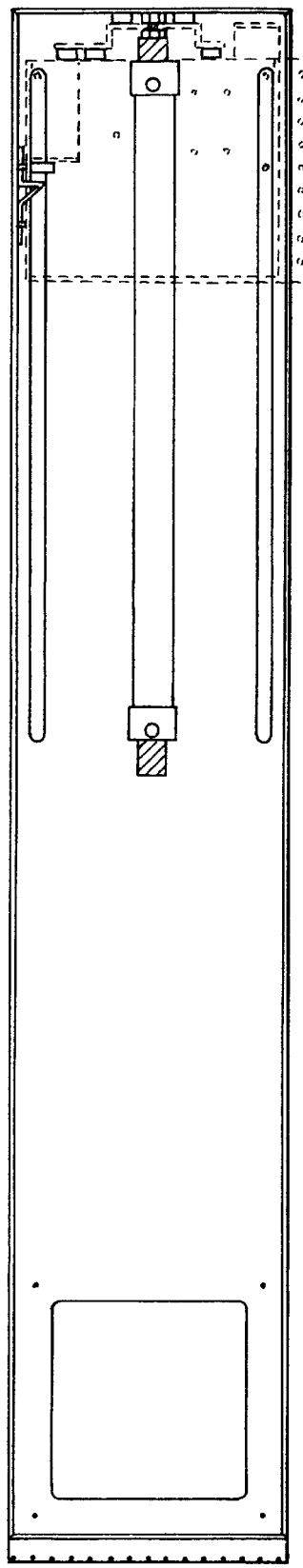
FIG. 16 is a rear view of another embodiment of the sliding door in which a pneumatic piston is used to raise and lower the sliding door automatically.
Figure 17:
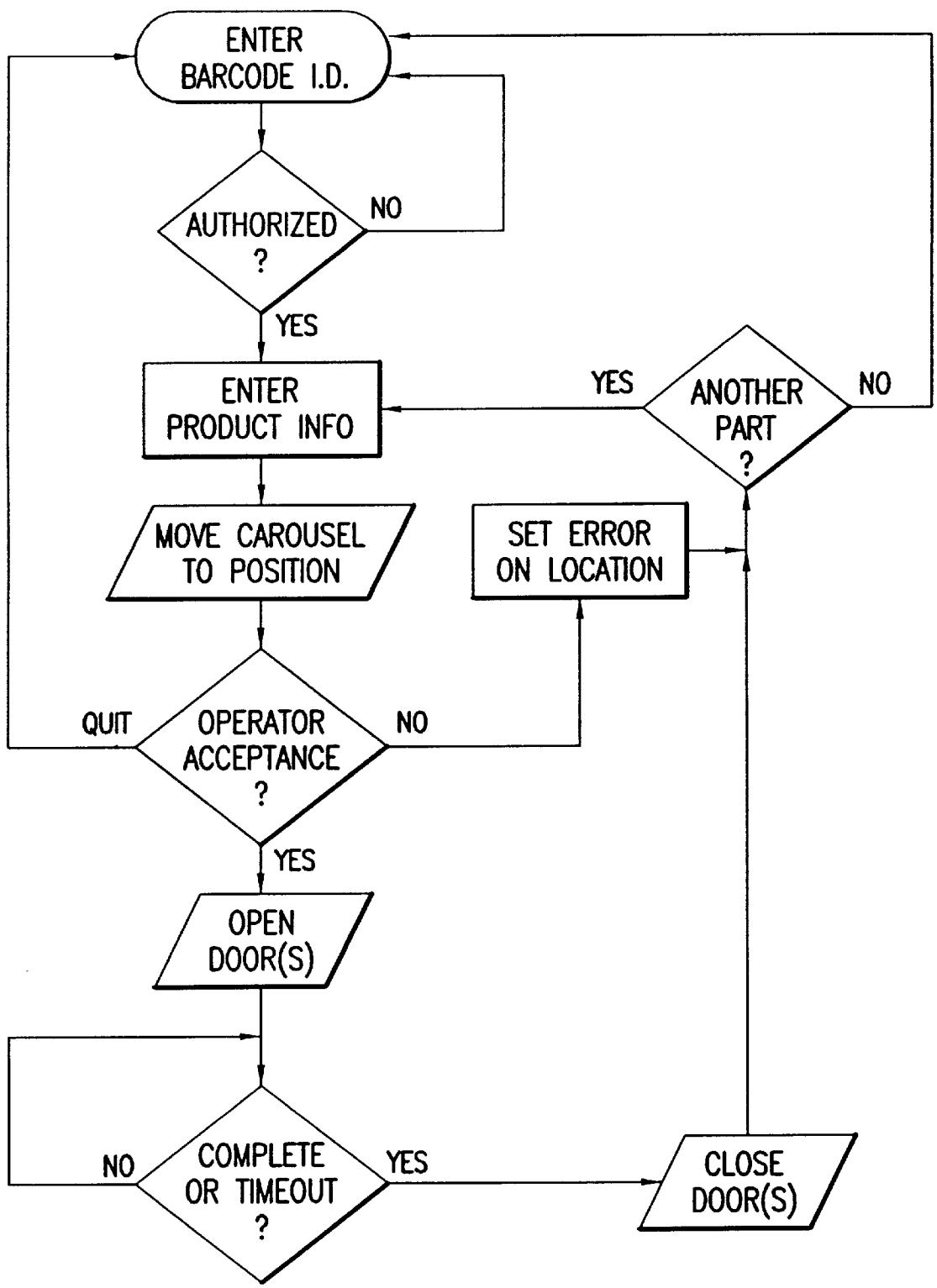
FIG. 17 is a flow chart showing typical retrieval and return transactions for the carousel of FIG. 2A.

FIG. 16 shows yet another sliding door mechanism. Specifically, a conventional pneumatic piston 70 can be used in lieu of the mechanism shown in FIGS. 9 and 14. The pneumatic piston 70 can both raise and lower the sliding door automatically. Because a solenoid is not used here, a blocking rail (not shown) can be positioned above the door, at a point about half of its full upward travel, to provide a half-height stop position. This embodiment is less expensive than the foregoing alternative, and is both most reliable and easiest to use.

The flow diagram which shows how an authorized operator gains access to a desired product is largely self-explanatory to one skilled in the storage and retrieval art. The step of entering the product information can be either the inputting of data for a first product or subsequent products without the operator having to reestablish authorization. After the carousel has been moved to the requested position but before the door(s) opens, the operator can chose to accept the transaction, quit the transaction or refuse the transaction with reporting on location error. After opening, the door will not close until the operator indicates that the transaction is complete and the product has been removed. The return of the product to the original location is accomplished in substantially the same way.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A storage and retrieval system comprising
   a housing;
   a carousel having carriers with compartments arranged above one another and rotatable in a vertical direction within the housing so as to pass a vertically disposed access area on at least one of a front face and a rear face of the housing; and
   a plurality of doors being provided at the access area and being configured to be selectively operable individually and as groups to provide authorized access to at least one selected carrier compartment of selectively variable unobstructed width adjacent the access area by a system operator, wherein the doors are pivotable about a horizontal axis at one edge thereof to move from and to a fully closed position and a fully open position.

2. The system according to claim 1, wherein a solenoid-actuated locking/unlocking mechanism is operatively associated with a respective door to provide authorized access to the interior of the housing.

3. The system according to claim 1, wherein a selected carrier can be moved to a plurality of positions adjacent the access area to provide access to a particular portion of the carrier.

4. The system according to claim 1, wherein the carrier compartments are dividable.

5. The system according to claim 4, wherein means is provided for dividing the carrier compartment into one of a regular array of identical compartments and a miscellaneous array of differently sized compartments.

6. The system according to claim 1, wherein the doors are provided with a viewing area to allow the operator to verify presence of contents in the at least one carrier compartment adjacent the access area.

7. The system according to claim 1, wherein the access area is on both the front and rear face of the housing.

8. The system according to claim 1, wherein the carriers are configured to allow access to contents thereon selectively from the front face and the rear face.

* * * * *